United States Patent [19]

Adams et al.

[11] 4,143,218

[45] Mar. 6, 1979

[54] POLYMERIC MATERIALS

[75] Inventors: Lionel B. Adams, Shrivenham; Keith V. Lovell, Swindon; Gordon Partridge, Swindon; Barbara J. Ringrose, Swindon, all of England

[73] Assignee: The Secretary of State for Defence in Her Britannic Majesty's Government of the United Kingdom of Great Britain and Northern Ireland, London, England

[21] Appl. No.: 832,478

[22] Filed: Sep. 12, 1977

[30] Foreign Application Priority Data

Sep. 14, 1976 [GB] United Kingdom ............... 38076/76

[51] Int. Cl.$^2$ .............................................. H01M 2/16
[52] U.S. Cl. ............................ 429/254; 210/500 M; 427/115; 427/322; 427/336; 427/430 R; 427/444; 427/445
[58] Field of Search ................... 210/500 M; 427/115, 427/336, 430 R, 322, 444, 445; 429/249, 250, 254

[56] References Cited

U.S. PATENT DOCUMENTS

| | | | |
|---|---|---|---|
| 3,035,110 | 5/1962 | Corren | 429/249 |
| 3,427,206 | 2/1969 | Scardaville | 427/115 |
| 3,497,072 | 2/1970 | Cannon | 210/500 M |
| 3,536,796 | 10/1970 | Rock | 429/250 |
| 3,720,321 | 3/1973 | Coughlin | 210/510 M |
| 3,892,594 | 7/1975 | Charlesby | 427/115 |
| 3,912,834 | 10/1975 | Imai | 427/336 |

*Primary Examiner*—Michael F. Esposito
*Attorney, Agent, or Firm*—Stevens, Davis, Miller & Mosher

[57] ABSTRACT

A method of treating a hydrophilic polymer film is described in which the film is immersed at a temperature greater than 80° C., and preferably greater than the crystalline melting point of the polymer, in a liquid capable of swelling the polymer. Polymers to which this method can be applied include graft copolymers of for example polyethylene, polypropylene, polytetrafluoroethylene, and nylon with acrylic or methacrylic acid. The films when treated have decreased electrical resistance and increased hydroxyl ion permeability and are then useful as battery separators and in other semi permeable membrane applications.

16 Claims, No Drawings

POLYMERIC MATERIALS

The present invention is concerned with methods of heat treatment of polymers and with polymers so heat treated, and is particularly concerned with graft copolymers.

Graft copolymers are well known and preparative methods are well documented, for example in "Graft Copolymers" by H. A. Battaerd and G. W. Tregear (Vol 16 of Polymer Reviews) published in 1967 by Interscience, "Radiation Chemistry of Polymeric Systems" edited by A. Chapiro (Vol 15 of High Polymers) published in 1962 by Interscience, and "Modern Plastics", 35 (1957) page 171–176. They are conveniently prepared by polymerisation of a monomer in the presence of a polymeric substrate using initiation means, generally irradiation, which generates free radical sites on the backbone of the existing polymer which initiate copolymerisation of the monomer. A certain amount of cross-linking and homopolymerisation may also take place.

Amongst the most important of these graft copolymers are those in which a hydrophobic backbone, eg polyethylene, is grafted with a hydrophilic monomer, eg acrylic acid, resulting in materials having uses as semi-permeable membranes in dialysis separators, in water purification apparatus by the phenomena of ultrafiltration or reverse osmosis, and as anolyte-catholyte separators in electrochemical systems. The use of these materials in primary and secondary alkaline and acid batteries is to replace the long established and somewhat unsatisfactory cellulosic separator as indicated in "Zinc-Silver Oxide Batteries" edited by A. Fleisher and J. Lander and published by J. Wiley & Sons in 1971. (see particularly page 271).

In accordance with the present invention a film of hydrophilic polymeric material is immersed at an elevated temperature, for example in excess of 80° C., in a liquid treatment medium as defined hereafter capable of swelling the hydrophilic polymeric material after which the liquid treatment medium is removed by quenching and washing in cold water or dilute alkaline solution. It has been discovered that the treated material may be quenched in either dilute alkali or in distilled water at about room temperature or indeed it may be quenched to about room temperature in air, after which it is normally washed, for example in dilute alkali.

Preferably the treatment temperature is above the crystalline melting point of the hydrophilic polymeric material and the optimum temperature for any particular treatment will vary depending upon the identity of the hydrophilic polymeric material being treated and the properties desired in the final material.

Suitable hydrophilic polymeric materials include graft copolymers in which a hydrophilic comonomer is grafted on to a hydrophobic polymer backbone or base polymer, sulphonated polymers, and polymers containing quaternary ammonium groups, for example containing pyridine or pyrrolidone groups.

In a preferred embodiment of the invention the hydrophilic polymeric material is a graft copolymer on any of the polyolefins or copolyolefins, for example polyethylene (low, medium or high density), polypropylene, poly 4-methylpentene-1 (and copolymers of these polyolefins), products of other vinyl polymerisations, for example polyvinylacetate and polyvinylalcohol as well as the halogen containing polymers or copolymers, for example polyvinylchloride, chlorinated polymers, and polytetrafluorethylene polychlorofluoroethylene, products of condensation polymerisations, for example polyamides or copolymides, ie the nylons, or the saturated and the un-saturated polyesters, or a mixture of any of these polymers. The hydrophilic comonomer may be any reactive polar vinyl monomer selected from acrylic acid, methacrylic acid, other ethylenic carboxylic acids, for example itaconic acid, ethylene carboxylic acid amides, for example acrylamide and methacrylamide, and ethylenic carboxylic acid amines, for example butylamine acrylate, and organic bases capable of quaternisation for example vinylpyridine or vinylpyrrolidone. Of these acrylic acid and methacrylic acid are preferred and acrylic acid is the most commonly used.

These graft copolymers may be polymerised by any suitable method although the preferred technique is radiation initiated grafting with high energy radiation, for example gamma photons or accelerated electrons. The copolymers may include additives such as filler particles or other additives such as thermal or oxidation stabilisers, dyes, and pigments.

The hydrophilic polymeric material should be adequately cross-linked to ensure the integrity of the film during treatment. In certain instances, for example graft copolymers using acrylic acid as the comonomer, sufficient cross-linking is normally introduced during the grafting process. If sufficient cross-linking is not present in the polymer then it may be introduced, for example by irradiation, or possibly by chemical means using divinyl benzene, for example, as cross-linking agent. The presence of cross-linking may be checked by a conventional gel test in a solvent. In this way the mechanical integrity of the film of hydrophilic polymeric material may be ensured during the reaction.

Advantageously the liquid treatment medium is a hydroxyl containing organic liquid and suitable liquids include alkanols, for example octanol or decanol, polyhydric alcohols, for example glycerol, mono-, di-, and tri-ethylene glycol and polyethylene glycol and although the liquid treatment medium is normally substantially non-aqueous may also include azeotropic mixtures of alkanols and polyhydric alcohols containing less than about 20% by weight of water. The preferred heat treatment medium is glycerol. The heat treatment medium may include up to 5% molar of an alkali or alkaline earth metal hydroxide and potassium hydroxide is preferred.

The object of the process of the present invention is to improve certain properties of the film of hydrophilic polymeric material so as to make it more useful as a battery separator material. The process produces film material which tends to have a decreased electrical resistance, increased hyroxyl ion permeability, increased rate of wetting out (as defined hereinafter) and in increased equilibrium water content (as defined hereinafter) when compared with the untreated film.

The optimum time of heat treatment varies with the values of the various parameters employed, eg temperature of treatment bath, identity of heat treatment medium and it is believed that in each instance there is a particular time after which no improvement takes place. The optimum time tends to be measured in minutes rather than hours in most instances.

It is believed that the present process achieves its beneficial effects by relieving stresses and strains in the molecular structure through increasing molecular movement and permitting reorientation and rearrangement of the molecular structure. X-ray crystallography shows that there is no marked reduction in total bulk crystalline content although there is a marked reduction in the degree of preferred molecular orientation originating in the base film from which the copolymer was made. The process is usually accompanied by changes in the dimensions of the material in length, breadth and thickness, further indication of a relaxation and reordering of structure.

It has been discovered that no chemical interaction occurs between the copolymer and the treatment medium in the process of the present invention as determined by spectrophotometric analysis before and after treatment; neither is there a weight loss of copolymer during processing indicating that the process is not a leaching out treatment producing pores or voids in the material by removal of matter. The foregoing discussion of the postulated reaction mechanism is not to be construed as defining the extent or scope of the invention in any way.

The present invention will now be described by way of example only with reference to the following Examples.

The degree of grafting as used in the following is defined as $$(W_F - W_I)/W_F \times 100\%$$

where $W_F$ is the weight of the copolymer and $W_I$ is the weight of the original polymer film and the equilibrium water content of the copolymer film is defined as $$(W_W - W_D)/W_D \times 100\%$$

where $W_W$ is the weight of the sample after having been equilibrated in distilled water for 20 hours and $W_D$ is the weight of the same sample after drying in an oven in the presence of silica gel for 20 hours at 45° C.

The electrical resistivity of the material is determined by the method outlined on page 258 of "Alkaline Storage Batteries" by Falk & Selkind published by J. Wiley & Sons in 1969 in conjunction with a Wayne-Kerr Autobalance bridge using 30% aqueous Potassium hydroxide solution at 25° C. as electrolyte.

Wetting-out rate values refer to the time taken for the resistivity of the sample to fall from infinity at the moment of introduction of the electrolyte to a value 10% above the final equilibrium value. It is a measure of the rate of absorption of electrolyte by the separator and is related to porous structure and hydrophilic nature of the separator.

The hydroxyl ion permeability is measured at the rate at which hydroxyl ions migrate across the separator, at 25° C., from a cell compartment containing a 10 molar aqueous potassium hydroxide solution to a cell compartment containing initially only distilled water. The rate is measured titrimetrically using N hydrochloric acid with phenolphthalein as indicator.

EXAMPLE 1

A $12\mu$ thick low density polyethylene film (supplied by British Visqueen Ltd) having a size of 5 feet by 1 foot was rolled up with a single ply Blue Tissue paper interleaving and placed in a glass tube 22 inches × 1.5 inches, which was then filled with 500 ml of a 25% by volume aqueous solution of acrylic acid and containing 4g/l of Analar ferrous sulphate. The tube and contents were evacuated by water pump for 20 minutes at the end of which time it was back filled with nominally oxygen-free nitrogen and sealed. The tube was irradiated with gamma rays from a 60Co source at 20° C. to a total absorbed dose of $6 \times 10^5$ rad at a dose rate of $3.5 \times 10^4$ rad per hour. The graft copolymerised LDPE film was removed from the tube, washed three times with distilled water and air dried in a hot air oven. The weight of copolymerised acrylic acid was found to be 31.2% by weight, being an homogeneous graft.

The copolymer was subjected to heat treatment by immersion in a bath of Glycerol A.R. (ex BDH) at 122° C., for 5 minutes. Following immersion the film was quenched in 0.1N aqueous potassium hydroxide solution at 25° C. for 10 minutes and then air dried at 45° C.

The properties defined above were measured and the results listed in Table 1 below.

TABLE 1

| | Electrical resistivity ($\Omega cm^2$.) | Hydroxyl ion permeability (ml.M KOH. $cm^{-2}min^{-1}$) | Equilibrium water content % | Wetting-out rate (secs.) |
|---|---|---|---|---|
| Before heat treatment | 0.08 | 0.39 | 72 | 72 |
| After heat treatment | 0.03 | 0.53 | 135 | 12 |

EXAMPLE 2

A $38\mu$ thick low density polyethylene film (supplied by Metal Box Co Ltd) was graft copolymerised to a level of 32.5% with acrylic acid in the manner of example 1.

The heat treatment was carried out by immersion in Glycerol A.R. at 120° C. for 4 minutes followed by quenching and drying as in example 1. The properties were determined as above and are listed in Table 2 below.

TABLE 2

| | Electrical resistivity ($\Omega cm^2$) | Hydroxyl ion permeability (ml.M KOH $cm^{-2}min^{-1}$) | Equilibrium water content % | Wetting-out rate (secs.) |
|---|---|---|---|---|
| Before heat treatment | 0.18 | 0.12 | 70 | 440 |
| After heat treatment | 0.09 | 0.20 | 105 | 68 |

EXAMPLE 3

A $19\mu$ cast high density polythene film (supplied by Dickinson Robinson Ltd) was copolymerised with acrylic acid to a level of 28.3% by the technique of example 1.

The copolymer was subsequently heat treated by immersion in Glycerol A.R. at 120° C. for 5 minutes, quenched in dilute alkali and dried. The properties were determined as above and are listed in Table 4 below.

TABLE 3

| | Electrical resistivity ($\Omega cm^2$) | Hydroxyl ion permeability (ml.M KOH $cm^{-2}min^{-1}$) | Equilibrium water content % | Wetting-out rate (secs.) |
|---|---|---|---|---|
| before heat treatment | 0.12 | 0.29 | 48 | 560 |
| After heat | 0.12 | 0.27 | 62 | 100 |

TABLE 3-continued

|  | Electrical resistivity ($\Omega cm^2$) | Hydroxyl ion permeability (ml.M KOH $cm^{-2}min^{-1}$) | Equilibrium water content % | Wetting-out rate (secs.) |
|---|---|---|---|---|
| treatment |  |  |  |  |

EXAMPLE 4

A 25μ polytetrafluorethylene film (supplied by Polypenco Ltd) was grafted, in a similar manner to example 1, with acrylic acid to a level of 12.4%.

The copolymer film was heat treated by immersion in Glycerol A.R. at 120° C. for 4 minutes, followed by quenching in dilute alkali and air drying. The properties were determined as above and are listed in Table 4 below.

TABLE 4

|  | Electrical Resistivity ($\Omega cm^2$) | Hydroxyl ion Permeability (ml M.KOH $cm^{-2}min^{-1}$) | Equilibrium water content % | Wetting-out rate (secs) |
|---|---|---|---|---|
| Before heat treatment | 0.18 | 0.18 | 29 | 127 |
| After heat treatment | 0.18 | 0.20 | 31 | 90 |

EXAMPLE 5

A 40μ thick film of polyamide (GRILAMID L25 Nylon 12) film (supplied by Grilon Plastics Ltd) was graft copolymerised to a level of 41.5% with acrylic Acid in the manner of example 1.

The heat treatment was carried out by immersion in glycerol AR at 190° C. for 5 minutes followed by quenching and drying as in Example 1 and the properties determined and listed in Table 5 below.

TABLE 5

|  | Electrical Resistance ($\Omega.cm^2$) | Hydroxyl ion permeability (mlN KOH $cm^{-2}min^{-1}$) | Equilibrium water content % | Wetting out rate (secs) |
|---|---|---|---|---|
| Before heat treatment | 0.16 | 0.10 | 26 | 425 |
| After heat treatment | 0.04 | 0.60 | 915 | 15 |

EXAMPLE 6

A 32μ thick cast polypropylene film (supplied by Shorko Films Ltd) was graft copolymerised to a level of 33.5% with Acrylic acid in the manner of example 1.

The heat treatment was carried out by immersion in glycol AR at 190° C. for 5 minutes followed by quenching and drying as in example 1 to give material having the properties listed in Table 6 below.

TABLE 6

|  | Electrical Resistance ($\Omega.cm^2$) | Hydroxyl ion permeability (ml N KOH $cm^{-2}min^{-1}$) | Equilibrium water content % | Wetting out rate (secs) |
|---|---|---|---|---|
| Before heat treatment | 0.11 | 0.25 | 27 | 120 |
| After heat treatment | 0.08 | 0.37 | 142 | 45 |

TABLE 6-continued

|  | Electrical Resistance ($\Omega.cm^2$) | Hydroxyl ion permeability (ml N KOH $cm^{-2}min^{-1}$) | Equilibrium water content % | Wetting out rate (secs) |
|---|---|---|---|---|
| treatment |  |  |  |  |

EXAMPLE 7

A 19μ thick cast film of high density polyethylene (supplied by Dickinson Robinson Group Ltd, Packaging Division) was graft copolymerised to a level of 55.3% with acrylic acid.

The heat treatment was carried out by immersion in glycerol AR at 190° C. for 5 minutes followed by quenching and drying as in example 1 to give material having the properties listed in Table 7 below.

TABLE 7

|  | Electrical resistance ($\Omega.cm^2$) | Hydroxyl ion permeability (ml N KOH $cm^{-2}min^{-1}$) | Equilibrium water content % | Wetting out rate (secs) |
|---|---|---|---|---|
| Before heat treatment | 0.04 | 0.46 | 43 | 20 |
| After heat treatment | 0.02 | 0.52 | 207 | 10 |

EXAMPLE 8

A 38μ thick cast low density polyethylene (supplied by Dixons Ltd) was graft copolymerised to a level of 43.8% with methacrylic acid in the manner described in Example 1.

The heat treatment, quenching and drying was carried out in the manner of example 1 to yield material having the properties set out in Table 8 below.

TABLE 8

|  | Electrical resistance ($\Omega.cm^2$) | Hydroxyl ion permeability (ml N KOH $cm^{-2}min^{-1}$) | Equilibrium water content % | Wetting out rate (secs) |
|---|---|---|---|---|
| Before heat treatment | 2.0 | 0.01 | 15 | >1000 |
| After heat treatment | 0.8 | 0.07 | 81 | >1000 |

EXAMPLE 9

This example illustrates three difference methods of quenching the material after the heat treatment of the present invention.

A 25μ thick film of low density polyethylene film (supplied by British Visqueen Ltd) was graft copolymerised to a level of 34.8% with acrylic acid as described in Example 1.

The heat treatment was carried out by immersion in glycerol AR at 120° C. for 5 minutes followed by one of the following quenching treatments:

(a) quenched in 0.1N aqueous potassium hydroxide solution at 25° C. for 10 minutes followed by drying in air at 45° C.

(b) quenched in distilled water at 20° C. for 10 minutes followed by drying in air at 45° C.

(c) Air cooled in contact with glycerol AR from 120° C. to 25° C. followed by washing in 0.1N aqueous KOH solution at 25° C. Air dried at 45° C.

The properties of the products were determined and are listed in Table 9 below.

TABLE 9

| Sample | Electrical resistance ($\Omega.cm^2$) | Hydroxyl ion permeability (ml N KOH $cm^{-2}min^{-1}$) | Equilibrium water content % | Wetting out rate (secs) |
|---|---|---|---|---|
| Before heat treatment | 0.11 | 0.20 | 25 | 145 |
| After quenching treatment (a) | 0.06 | 0.37 | 88 | 44 |
| After quenching treatment (b) | 0.06 | 0.44 | 68 | 47 |
| After quenching treatment (c) | 0.05 | 0.40 | 94 | 41 |

As will be seen all three methods of quenching give similar results but generally method (a) is preferred.

EXAMPLE 10

This example illustrates the use of heat treatment media other than glycerol.

A 25μ thick low density polyethylene film (supplied by British Visqueen Ltd) was graft copolymerized to a level of 34.8% with Acrylic Acid in the manner of example 1 and samples were subjected to each of the following heat treatments:

(a) Immersion in a bath of diethylene glycol (supplied by Koch Light Laboratories) at 120° C. for 5 minutes (b) Immersion in a bath of polyethylene glycol (Code No 200 supplied by BDH Ltd) at 120° C. for 5 minutes.

After the heat treatment the materials were then quenched and dried as described in Example 1 and the properties determined to give the results quoted in Table 10 below.

TABLE 10

| Sample | Electrical resistance ($\Omega.cm^2$) | Hydroxyl ion permeability (ml N KOH $cm^{-2}min^{-1}$) | Equilibrium water content % | Wetting rate (secs) |
|---|---|---|---|---|
| Before heat treatment | 0.11 | 0.20 | 25 | 145 |
| After heat treatment and quench (a) | 0.05 | 0.50 | 113 | 18 |
| After heat treatment and quench (b) | 0.05 | 0.49 | 116 | 17 |

EXAMPLE 11

This example illustrates the addition of alkali metal hydroxide particularly potassium hydroxide to the heat treatment medium.

A 12μ thick low density polyethylene film (ex British Visqueen Ltd) was graft copolymerised to a level of 31.2% with acrylic acid as in example 1.

The heat treatment was carried out by immersion in glycerol AR in which had been dissolved 5% weight for volume of Analar (ex BDH Ltd) potassium hydroxide, for 5 minutes at 122° C., followed by quenching and drying as in example 1 and the properties of the material are given in Table 11 below.

TABLE 11

| | Electrical resistance ($\Omega.cm^2$) | Hydroxyl ion premeability (ml N KOH $cm^{-2}min^{-1}$) | Equilibrium Water content % | Wetting out rate (secs) |
|---|---|---|---|---|
| After treatment in Glycerol only | 0.03 | 0.53 | 135 | 12 |
| After treatment in Glycerol & 5% w/v KOH | 0.02 | 0.58 | 140 | 10 |

This illustrates a marginal improvement in the properties of the film with the addition of potassium hydroxide to the heat treatment medium.

EXAMPLE 12

This Example illustrates the effect of temperature upon the process of the present invention.

(a) A 19μ thick cast film of high density polyethylene (supplied by Dickinson Robinson Group Ltd, Packaging Division) was graft copolymerised to a level of 55.3% with acrylic acid similarly to Example 1.

Heat treatment was carried out in a bath of glycerol AR at temperatures of 120° C. and 190° C. for 5 minutes. Quenching and drying were carried out in the manner of example 1 and the properties of the products are given in Table 12 below.

TABLE 12

| | Electrical resistance ($\Omega.cm^2$) | Hydroxyl ion permeability (ml N KOH cm min) | Equilibrium water content % | Wetting out rate (secs) |
|---|---|---|---|---|
| Before heat treatment | 0.04 | 0.46 | 43 | 20 |
| After treatment at 120° C | 0.03 | 0.51 | 78 | 13 |
| After treatment at 190° C | 0.02 | 0.52 | 207 | 10 |

(b) A 32μ thick cast polypropylene film (supplied by Shorko Films Ltd) was graft copolymerised to a level of 33.5% with acrylic acid in the manner of example 1.

Heat treatment was carried out in a bath of glycerol AR at temperatures of 120° C. and 190° C. for 5 minutes. Quenching and drying were carried out as in example 1 and the properties of the products are given in Table 13 below.

TABLE 13

| | Electrical resistance ($\Omega.cm^2$) | Hydroxyl ion permeability (ml N KOH $cm^{-2}min^{-1}$) | Equilibrium water content % | Wetting out rate (secs) |
|---|---|---|---|---|
| Before heat treatment | 0.11 | 0.25 | 27 | 120 |
| After heat treatment at 120° C | 0.16 | 0.21 | 79 | 180 |
| After heat treatment at 190° C | 0.08 | 0.37 | 142 | 45 |

(c) A 40μ thick polyamide (Grilamid L25 Nylon 12) supplied by Grilon Plastics Ltd was graft copolymerised to a level of 41.5% with acrylic acid in the manner of Example 1.

Heat treatment was carried out in a bath of glycerol AR at temperatures of 120° C. and 190° C. for 5 minutes. Quenching and drying were carried out as in Example 1 and the properties of the products are given in Table 14 below.

TABLE 14

| | Electrical resistance ($\Omega.cm^2$) | Hydroxyl ion permeability (ml N KOH $cm^{-2}min^{-1}$) | Equilibrium water content % | Wetting out rate (secs) |
|---|---|---|---|---|
| Before heat treatment | 0.16 | 0.10 | 26 | 425 |
| After heat treatment at 120° C | 0.20 | 0.20 | 64 | 580 |
| After heat treatment at 190° C | 0.04 | 0.60 | 915 | 15 |

The base polymers used in this example (a) cast high density polyethylene, (b) cast polypropylene, and (c) nylon 12 have crystalline melting points of 127° C., 159° C., and 175° C. respectively. The crystalline melting points of the respective graft copolymers are 127° C., 157° C., and 174° C. The results quoted in Tables 12 to 14 indicate that the best improvement in properties is obtained when the heat treatment temperature is above the crystalline melting point of the copolymer. It has been found that below the crystalline melting point, the results are variable.

We claim:

1. A method of treating a film of hydrophilic polymeric material selected from graft copolymers in which a hydrophilic comonomer is grafted on to a hydrophobic base polymer, sulphonated polymers, and polymers containing a quaternary ammonium group, which includes the steps of
   a. immersing, at a temperature in excess of 80° C., said film of polymeric material in a liquid treatment material consisting of a liquid which is mainly organic and contains hydroxyl groups or ions and is capable of swelling the said hydrophilic polymeric material, and
   b. removing the liquid treatment medium by quenching the said film to about room temperature and washing the said polymeric film in a wash liquid selected from cold water or dilute alkaline solution.

2. A method as claimed in claim 1 and wherein the temperature of the liquid treatment material is above the crystalline melting point of the said hydrophilic polymeric material.

3. A method as claimed in claim 1 and wherein the liquid treatment material is selected from alkanols, polyhydric alcohols, ethylene glycols and polyethylene glycols.

4. A method as claimed in claim 3 and wherein the heat treatment material is selected from glycerol, diethylene glycol and polyethylene glycol.

5. A method as claimed in claim 3 and wherein the liquid treatment material also contains up to 5% molar of an alkali metal or alkaline earth metal hydroxide.

6. A method as claimed in claim 5 and wherein the alkali metal hydroxide is potassium hydroxide.

7. A battery separator comprising the product of the process of claim 1.

8. A method of treating a film of hydrophilic polymeric material which includes the steps of
   a. immersing, at a temperature in excess of 80° C., the said film of polymeric material in a liquid treatment material consisting of a liquid which is mainly organic and contains hydroxyl groups or ions and is capable of swelling the said hydrophilic polymeric material, and
   b. removing the liquid treatment medium by quenching the said film to about room temperature and washing the said polymeric film in a wash liquid selected from cold water or dilute alkaline solution, wherein the hydrophilic polymeric material is graft copolymer in which a hydrophilic comonomer is grafted on to a hydrophobic base polymer, and the said base polymer being selected from polyolefins, copolyolefins, condensation polymers, and mixtures thereof, and the hydrophilic comonomer is selected from ethylenic carboxylic acids, ethylenic carboxylic acid amides, ethylenic carboxylic acid amines, and organic bases capable of quaternization.

9. A method as claimed in claim 8 and wherein the said base polymer is selected from low, medium and high density polyethylene, polypropylene, poly-4-methylpentene-1, polyvinylacetate, polyvinylalcohol, polyvinylchloride, chlorinated rubber, polytetrafluoroethylene, polychlorofluoroethylene, polyamides, copolyamides, saturated and unsaturated polyesters, and mixtures and copolymers thereof.

10. A method as claimed in claim 8 and wherein the said hydrophilic copolymer is selected from acrylic acid, metacrylic acid, itaconic acid, acrylamide methacrylamide, butylamine acrylate, vinyl pyridine and vinyl pyrrolidone.

11. A method as claimed in claim 8 and wherein the said base polymer is selected from low, medium and high density polyethylene, polypropylene, polytetrafluoroethylene and polyamides and the said hydrophilic comonomer is selected from acrylic acid and methyacrylic acid.

12. A method as claimed in claim 8 and wherein the temperature of the liquid treatment material is above the crystalline melting point of the said hydrophilic polymeric material.

13. A method as claimed in claim 8 and wherein the liquid treatment material is selected from alkanols, polyhydric alcohols, ethylene glycols and polyethylene glycols.

14. A method as claimed in claim 13 and wherein the heat treatment material is selected from glycerol, diethylene glycol and polyethylene glycol.

15. A method as claimed in claim 13 and wherein the liquid treatment material also contains up to 5% molar of an alkali metal or alkaline earth metal hydroxide.

16. A process for decreasing the electrical resistance, increasing the hydroxyl ion permeability, increasing the rate of wetting out and increasing the equilibrium water content of a cross-linked polymer film which comprises immersing a graft copolymer film in which the graft copolymer has been prepared by grafting a hydrophilic comonomer onto a hydrophobic base polymer, sulfonated polymer or a polymer containing a quaternary ammonium group at a temperature above 80° C. in a polyhydric alcohol, cooling the film to about room temperature and washing the film with cold water or a dilute aqueous alkaline solution.

* * * * *